US012339939B2

(12) United States Patent
Tazume

(10) Patent No.: US 12,339,939 B2
(45) Date of Patent: Jun. 24, 2025

(54) INFORMATION PROCESSING APPARATUS, INFORMATION PROCESSING METHOD, AND INFORMATION PROCESSING SYSTEM

(71) Applicant: RAKUTEN GROUP, INC., Tokyo (JP)

(72) Inventor: Toshiaki Tazume, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 577 days.

(21) Appl. No.: 17/359,673

(22) Filed: Jun. 28, 2021

(65) Prior Publication Data

US 2022/0075851 A1    Mar. 10, 2022

(30) Foreign Application Priority Data

Sep. 4, 2020   (JP) ................................ 2020-149469

(51) Int. Cl.
  *G06F 21/31* (2013.01)
  *G06Q 10/0832* (2023.01)
  *G06Q 10/0833* (2023.01)

(52) U.S. Cl.
  CPC ......... *G06F 21/31* (2013.01); *G06Q 10/0832* (2013.01); *G06Q 10/0833* (2013.01)

(58) Field of Classification Search
  USPC .......................................................... 726/2
  See application file for complete search history.

(56) References Cited

U.S. PATENT DOCUMENTS 9,202,194 B1    12/2015 Mistry
9,256,852 B1 *   2/2016 Myllymaki ............. B60P 3/007
(Continued)

FOREIGN PATENT DOCUMENTS

CN    103584701 A  *  2/2014 ............ A47G 29/12
CN    108717755 A     10/2018
(Continued)

OTHER PUBLICATIONS

Office Action of May 10, 2022, for related U.S. Appl. No. 17/141,163 pp. 1-25.
(Continued)

*Primary Examiner* — Sanchit K Sarker
(74) *Attorney, Agent, or Firm* — HEA Law PLLC

(57) ABSTRACT

Provided is an information processing apparatus acquiring a recipient user who is a delivery destination, determining whether or not to use already issued authentication information for receiving a package based on the recipient user and authentication information stored in a storage unit, the storage unit storing the already issued authentication information in association with a user who is an issuing destination, issuing new authentication information as the authentication information used for receiving the package and storing the issued authentication information in association with the recipient user in the storage unit when it is determined that the already issued authentication information is not used for receiving the package, and acquiring the authentication information stored in the storage unit as the authentication information used for receiving the package when it is determined that the already issued authentication information is used for receiving the package.

15 Claims, 15 Drawing Sheets

(56) References Cited

U.S. PATENT DOCUMENTS

| | | | |
|---|---|---|---|
| 10,303,171 B1 | 5/2019 | Brady et al. | |
| 2008/0177636 A1 | 7/2008 | Yoshida et al. | |
| 2011/0002302 A1* | 1/2011 | Ding | H04W 76/22 370/331 |
| 2014/0180914 A1* | 6/2014 | Abhyanker | G06Q 10/0832 705/332 |
| 2017/0132634 A1 | 5/2017 | James | |
| 2017/0236193 A1* | 8/2017 | Zundel | G06Q 20/20 705/16 |
| 2017/0289172 A1* | 10/2017 | Turakhia | H04L 63/062 |
| 2019/0202405 A1 | 7/2019 | Sakurada et al. | |
| 2019/0205966 A1 | 7/2019 | Igata et al. | |

FOREIGN PATENT DOCUMENTS

| | | |
|---|---|---|
| JP | 2008028983 A | 2/2008 |
| JP | 2018058656 A | 4/2018 |
| JP | 2019121086 A | 7/2019 |
| JP | 2019121123 A | 7/2019 |

OTHER PUBLICATIONS

Office Action of Sep. 15, 2022, for related U.S. Appl. No. 17/141,163, pp. 1-8.

Office Action of Jan. 3, 2022, for related U.S. Appl. No. 17/141,163 pp. 1-22.

Office Action of Mar. 20, 2025, for corresponding CN Patent Application No. 202110720054.5 with English translation, pp. 1-25.

\* cited by examiner

FIG.10

| USER ID | DELIVERY DESTINATION ADDRESS | DELIVERY DESTINATION ROOM NUMBER | ASSOCIATED USER | REUSE FLAG | FAMILY FLAG |
|---|---|---|---|---|---|
| AAA | XYZ | 501 | BBB | ON | ON |
| BBB | XYZ | 501 | AAA | ON | ON |
| CCC | XYZ | 501 | | ON | OFF |
| DDD | XYZ | 601 | | OFF | OFF |

FIG.11

| RECEPTION LOCATION | AUTHENTICATION INFORMATION | ISSUED DATE AND TIME | USER ID | REUSE TIME LIMIT | RESTRICTION TIME LIMIT | DELIVERY VEHICLE | PERSON LIMITATION FLAG |
|---|---|---|---|---|---|---|---|
| R1 | 123456 | 2020/3/1 10:00 | AAA | 2020/3/1 | 2020/3/3 | V1 | |
| R1 | 123123 | 2020/2/29 15:00 | BBB | 2020/2/29 | 2020/3/2 | V2 | |
| R1 | 654321 | 2020/3/1 15:00 | CCC | 2020/3/1 | 2020/3/3 | V3 | |
| R2 | 123123 | 2020/3/1 15:05 | FFF | 2020/3/1 | 2020/3/3 | V2 | |

FIG.12

| RECEPTION LOCATION | AUTHENTICATION INFORMATION | ISSUED DATE AND TIME | USER ID | REUSE TIME LIMIT | RESTRICTION TIME LIMIT | DELIVERY VEHICLE | PERSON LIMITATION FLAG |
|---|---|---|---|---|---|---|---|
| R1 | 123456 | 2020/3/1 10:00 | AAA | 2020/3/1 | 2020/3/3 | V1 | |
| R1 | 123123 | 2020/2/29 15:00 | BBB | 2020/2/29 | 2020/3/2 | V2 | |
| R1 | 654321 | 2020/3/1 15:00 | CCC | 2020/3/1 | 2020/3/3 | V3 | |
| R2 | 123123 | 2020/3/1 15:05 | FFF | 2020/3/1 | 2020/3/3 | V2 | |
| R1 | 133333 | 2020/3/1 21:00 | AAA | 2020/3/2 | 2020/3/4 | V1 | ON |
| R1 | 123456 | 2020/3/4 10:00 | DDD | 2020/3/4 | 2020/3/6 | V1 | |

# INFORMATION PROCESSING APPARATUS, INFORMATION PROCESSING METHOD, AND INFORMATION PROCESSING SYSTEM

CROSS-REFERENCE TO RELATED APPLICATION

The present application claims priority from Japanese application JP2020-149469 filed on Sep. 4, 2020, the content of which is hereby incorporated by reference into this application.

FIELD OF THE INVENTION

The present invention relates to an information processing apparatus, an information processing method, and an information processing system.

BACKGROUND OF THE INVENTION

There is an increasing number of cases of receiving transported packages regarding online shopping, for example, outside entrances of home buildings. When receiving the package, in order to prevent theft of the package by impersonation, the recipient is required to enter authentication information, and the package is transferred to the recipient after the recipient is authenticated.

In JP 2019-121123 A, there is disclosed a system in which authentication information is issued to a recipient, a vehicle is unlocked when the recipient inputs the authentication information into an in-vehicle device of the vehicle, and a product is enabled to be received from the inside of the vehicle. In this system, the authentication information is also used when returning the product to the vehicle. Further, in Paragraph, it is disclosed that the authentication information of which validity period has expired is allowed to be invalidated and that double issuing of the authentication information is avoided.

In JP 2008-28983 A, there is disclosed a system that secures privacy by using a public key cryptosystem to maintain anonymity and nonbonding that does not allow the same user to be determined. In this system, it is disclosed that the user is allowed to be associated with the order by the user disclosing an order ID and a password to the system. Further, in Paragraph, it is disclosed that when the user discloses the order ID and the password to the system, the system also uses the disclosed password for other orders with respect to the user.

SUMMARY OF THE INVENTION

When the user receiving the package is to be authenticated through use of input authentication information (for example, a passcode or a PIN), it is desired that the authentication information is not a duplicate of authentication information issued to other irrelevant users. This is because, if the authentication information is duplicated, a certain package may be transferred to a user irrelevant to the user who is to receive the package. On the other hand, since the amount of authentication information is finite, there has been desired a technique for effectively utilizing the amount of information while preventing an authentication error caused by duplication or the like.

Therefore, the present disclosure provides a technique for effectively utilizing the finite amount of authentication information when issuing the authentication information to the user who is to receive the package.

According to at least one embodiment of the present invention, there is provided an information processing apparatus including: an acquisition unit for acquiring a recipient user who is a delivery destination of a package; a determination unit for determining whether or not to use already issued authentication information for receiving the package based on the recipient user and authentication information stored in a storage unit, that storage unit storing the already issued authentication information in association with a user who is an issuing destination of the authentication information; and an authentication information decision unit for issuing new authentication information as the authentication information used for receiving the package and storing the issued authentication information in association with the recipient user in the storage unit when it is determined that the already issued authentication information is not used for receiving the package, and for acquiring the authentication information stored in the storage unit as the authentication information used for receiving the package when it is determined that the already issued authentication information is used for receiving the package.

According to at least one embodiment of the present invention, there is provided an information processing method including: acquiring a recipient user who is a delivery destination of a package; determining whether or not to use already issued authentication information for receiving the package based on the recipient user and authentication information stored in a storage unit, that storage unit storing the already issued authentication information in association with a user who is an issuing destination of the authentication information; and issuing new authentication information as the authentication information used for receiving the package and storing the issued authentication information in association with the recipient user in the storage unit when it is determined that the already issued authentication information is not used for receiving the package; and acquiring the authentication information stored in the storage unit as the authentication information used for receiving the package when it is determined that the already issued authentication information is used for receiving the package.

According to at least one embodiment of the present invention, there is provided an information processing system including: an acquisition unit for acquiring a recipient user who is a delivery destination of a package; a determination unit for determining whether or not to use already issued authentication information for receiving the package based on the recipient user and authentication information stored in a storage unit, that storage unit storing the already issued authentication information in association with a user who is an issuing destination of the authentication information; an authentication information decision unit for issuing new authentication information as the authentication information used for receiving the package and storing the issued authentication information in association with the recipient user in the storage unit when it is determined that the already issued authentication information is not used for receiving the package, and for acquiring the authentication information stored in the storage unit as the authentication information used for receiving the package when it is determined that the already issued authentication information is used for receiving the package; a reception control unit for controlling the package to be transferred to the recipient user when the recipient user inputs the authentication information used for receiving the package; and a device for transferring the package to the recipient user based on the control of the reception control unit.

Further, in at least one embodiment of the present invention, the information processing apparatus may further include a notification unit that notifies the user of the new authentication information and first information indicating that the new authentication information has been issued when the new authentication information is issued, and notifies the user of the acquired authentication information and second information when it is determined that the already issued authentication information is used for receiving the package, wherein the second information is different from the first information.

Further, in at least one embodiment of the present invention, the determination unit may determine whether or not the already issued authentication information is used for receiving the package based on whether or not the authentication information associated with the recipient user is stored in the storage unit or whether or not the authentication information associated with a user related to the recipient user is stored in the storage unit.

Further, in at least one embodiment of the present invention, the determination unit may determine whether or not the already issued authentication information is used for receiving the package based on the recipient user and an attribute of the package.

Further, in at least one embodiment of the present invention, the already issued authentication information and time limit information of the authentication information may be stored in the storage unit in association with the user who is the issuing destination of the authentication information, the time limit information may indicate a reuse time limit in which the already issued authentication information can be used for receiving the package, and the determination unit may determine whether or not the already issued authentication information is used for receiving the package based on the recipient user and the authentication information and the time limit information stored in the storage unit.

Further, in at least one embodiment of the present invention, the reuse time limit may be later than an input time limit at which the recipient user can input the authentication information to receive the package.

Further, in at least one embodiment of the present invention, the reuse time limit may be earlier than the time when the authentication information can be newly issued to a user different from the recipient user and a user related to the recipient user in order to receive another package.

Further, in at least one embodiment of the present invention, the determination unit may determine that the already issued authentication information is used for receiving the package when the already issued authentication information is stored in the storage unit in association with the recipient user, and after the authentication information is issued to the recipient user, the authentication information is not issued to a user different from the recipient user and a user related to the recipient user.

Further, in at least one embodiment of the present invention, a reception control unit may command that the stored package be transferred to the recipient user when the recipient user inputs the authentication information used for receiving the package at a location where the package is stored.

Further, in at least one embodiment of the present invention, a reception control unit may command that the package stored in a delivery vehicle be transferred to the recipient user when the recipient user inputs, to the delivery vehicle that stores the package and can move in an unmanned manner, the authentication information used for receiving the package.

According to one embodiment of the present invention, when issuing authentication information to a user in receiving a package, it is possible to effectively utilize a finite amount of the authentication information.

BRIEF DESCRIPTION OF THE DRAWINGS

FIG. 10 is a table for illustrating an example of data stored in a user table.

FIG. 11 is a table for illustrating an example of data stored in an issuing table.

FIG. 12 is a table for illustrating another example of data stored in the issuing table.

DETAILED DESCRIPTION OF THE INVENTION

Figure 1:
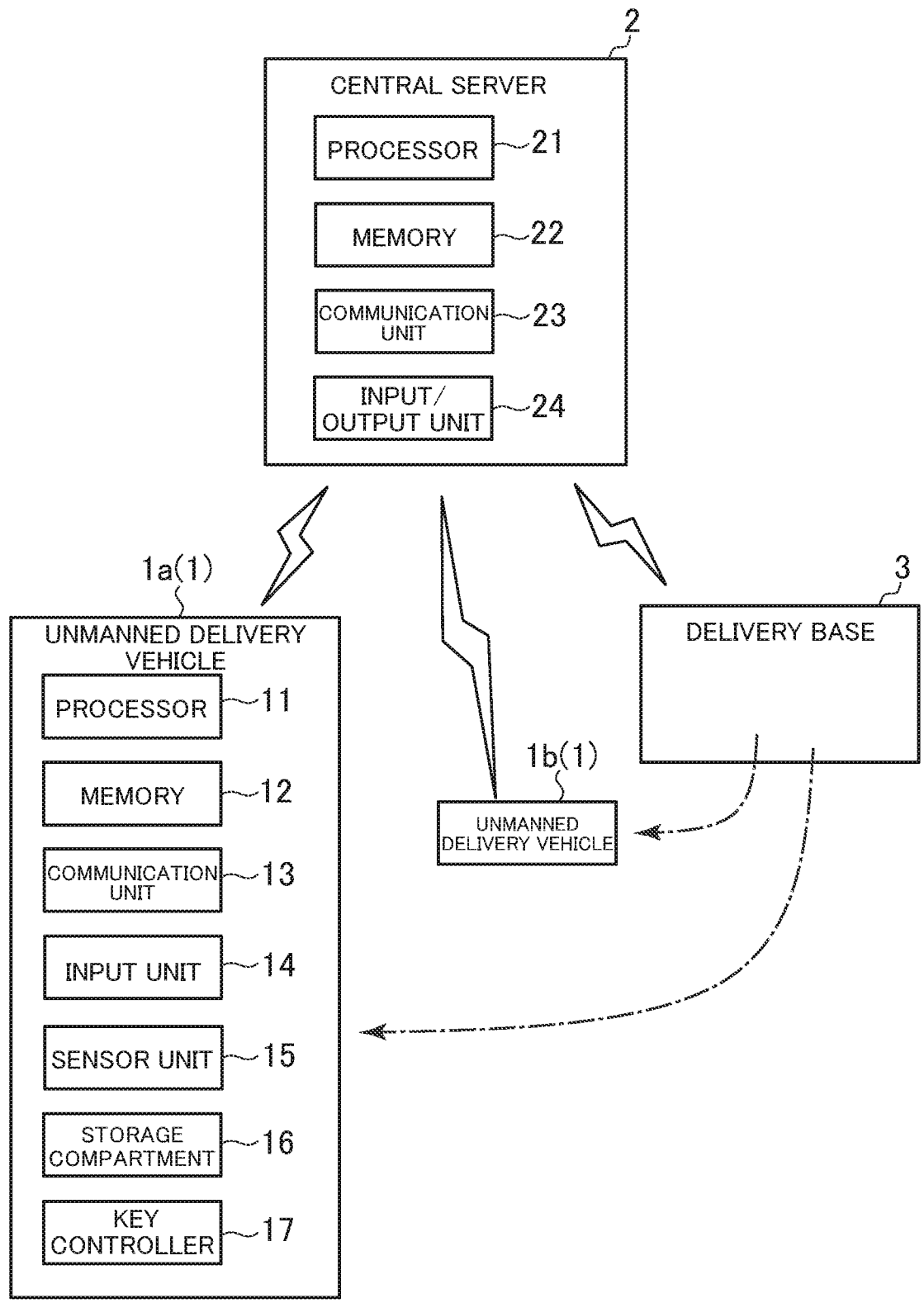
FIG. 1 is a diagram for illustrating an example of a configuration of a delivery system in at least one embodiment of the present invention.

Now, description is given of at least one embodiment of the present invention with reference to the drawings. A redundant description of components denoted by the same reference characters is omitted. In at least one embodiment, a system that can allow a user to receive, at a predetermined reception location, a package sent from a delivery source such as a store will be described.

First, as an example of the present embodiment, a package delivery system for delivering, using an unmanned delivery vehicle, packages to an apartment building or the like in which a plurality of users live will be described. FIG. 1 is a diagram for illustrating an example of a configuration of a delivery system in at least one embodiment of the present invention. As illustrated in FIG. 1, the package delivery system includes a plurality of unmanned delivery vehicles 1, a central server 2, and a delivery base 3.

The unmanned delivery vehicle 1 is a machine configured to travel on the ground to deliver a package under automatic control without accommodating a driver. The unmanned delivery vehicle 1 is called "unmanned ground vehicle (UGV)." In FIG. 1, two unmanned delivery vehicles 1a and 1b are illustrated, but the number of unmanned delivery vehicles 1 may be three or more. The unmanned delivery vehicle 1 is communicably connected to the central server 2 via wireless communication. The wireless communication may be based on a communication standard, for example, Long Term Evolution (LTE).

The central server 2 is configured to communicate to/from the plurality of unmanned delivery vehicles 1 and the delivery base 3 to manage operations thereof. The delivery base 3 includes a warehouse storing packages to be delivered to users, and in the delivery base 3, for example, an employee of the delivery base 3 stores a package addressed to a user in the unmanned delivery vehicle 1 based on an instruction from the central server 2. The plurality of unmanned delivery vehicles 1 are arranged in the delivery base 3, and the unmanned delivery vehicle 1 delivers the package to a reception location from the delivery base 3, and transfers the package to the user.

Figure 2:
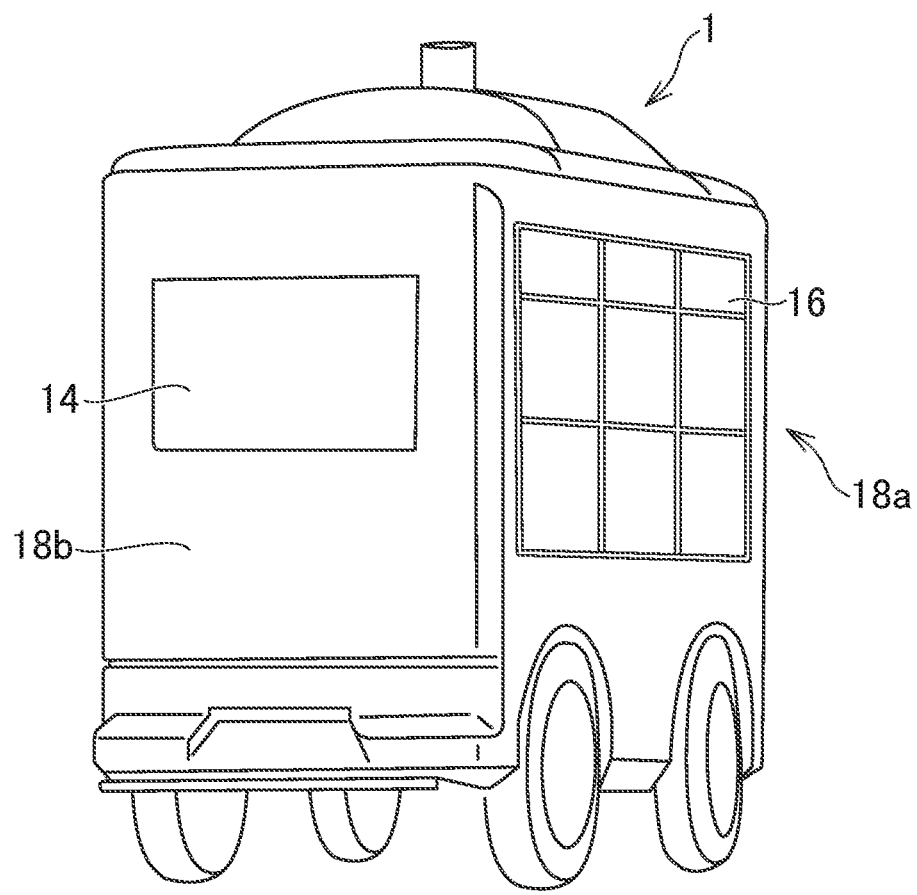
FIG. 2 is a perspective view for illustrating an example of an unmanned delivery vehicle.

FIG. 2 is a perspective view of an example of the unmanned delivery vehicle 1. As illustrated in FIG. 1 and FIG. 2, the unmanned delivery vehicle 1 includes a processor 11, a memory 12, a communication unit 13, an input/output unit 14, a sensor unit 15, a plurality of storage compartments 16, a key controller 17, and a drive unit (not illustrated).

The processor 11 is configured to execute processing in accordance with a program or data stored in the memory 12. Further, the processor 11 is configured to control the communication unit 13, the input/output unit 14, the sensor unit 15, and the key controller 17.

The memory 12 includes a volatile memory, for example, a RAM, and a non-volatile memory, for example, a flash memory. The memory 12 may further include a storage device, for example, a hard disk drive. The memory 12 stores the above-mentioned program. Further, the memory 12 stores information and calculation results, which are input from the processor 11, the communication unit 13, and the input/output unit 14. The above-mentioned program may be provided through, for example, the Internet, or may be stored in a storage medium capable of being read by a computer, for example, a flash memory, and provided.

The communication unit 13 includes, for example, an integrated circuit implementing a communication interface for wireless communication. The communication unit 13 is configured to input, based on control by the processor 11, information received from other apparatus to the processor 11 or the memory 12, and transmit the information to the other apparatus.

The input/output unit 14 includes a display output device, an input device, and interfaces with those devices. Specifically, the input/output unit 14 is a touch panel with a display (hereinafter referred to as "input panel"), and is used for inputting authentication information (for example, a PIN code or a passcode). The input/output unit 14 may be a display and a physical button, or may be other types of the display output device and input device. The input/output unit 14 is configured to display, based on control by the processor 11, an image on the display output device to acquire data input by the user on the input device.

The sensor unit 15 includes a lidar and a camera configured to recognize the size and position of a peripheral obstacle. The plurality of storage compartments 16 are regions for storing packages. The plurality of storage compartments 16 are provided on respective side surface of the unmanned delivery vehicle 1. Each storage compartment 16 has a takeout opening having a door, and a key is set on the door. The key controller 17 is a circuit configured to electrically control locking or unlocking of the key to the door. In the storage compartment 16, as a part of the sensor unit 15, a sensor configured to detect presence/absence of a package in the storage compartment 16 is arranged. In place of the door, there may be provided a mechanism, for example, a bar, which has a lock configured to prevent unloading of a package from the takeout opening.

The unmanned delivery vehicle 1 includes, on its periphery, side surfaces on which the doors of the storage compartment 16 are arranged, an end portion 18b being a surface which faces in a direction different from that of the side surface and on which the input/output unit 14 is arranged, and an end portion 18a being a surface opposed to the end portion 18b. The lidar is provided on a top surface of the unmanned delivery vehicle 1, and a camera (not illustrated) is arranged on the end portion 18a.

The central server 2 includes a processor 21, a memory 22, a communication unit 23, and an input/output unit 24. The central server 2 may be one physical server, or may include a plurality of physical servers like a so-called cloud computing system.

The processor 21 is configured to execute processing in accordance with a program and data stored in the memory 22. Further, the processor 21 is configured to control the communication unit 23 and the input/output unit 24.

The memory 22 includes a volatile memory, for example, a RAM, a non-volatile memory, for example, a flash memory, and a storage device, for example, a hard disk drive. The memory 22 stores the above-mentioned program. Further, the memory 22 stores information or calculation results, which are input from the processor 21, the communication unit 23, and the input/output unit 24. The above-mentioned program may be provided through, for example, the Internet, or may be stored in a storage medium capable of being read by a computer, for example, a flash memory, and provided.

The communication unit 23 includes, for example, an integrated circuit implementing a communication interface for wired communication. The communication unit 23 is configured to input, based on control by the processor 21, information received from other apparatus to the processor 21 or the memory 22, and transmit the information to the other apparatus. The communication unit 23 may communicate to/from the unmanned delivery vehicle 1 via a communication network and a wireless communication device included in the communication network.

The input/output unit 24 includes a video controller configured to control display, and a controller configured to acquire data from an input device. The input device includes, for example, a touch panel, a keyboard, or a mouse. The input/output unit 24 is configured to output, based on control by the processor 21, display data to the display output device, and acquire data input by the user through operation of the input device.

Figure 3:
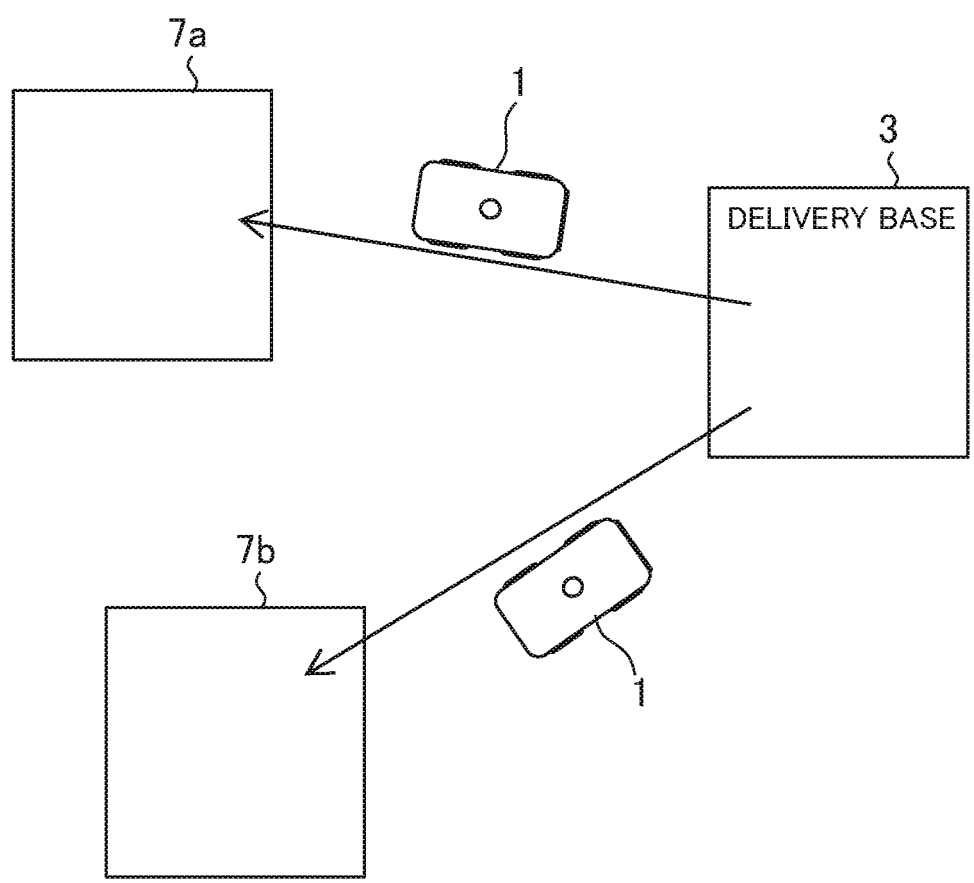
FIG. 3 is a diagram for schematically illustrating a delivery base and reception locations.

Description is now given of the delivery of a package by the package delivery system. FIG. 3 is a diagram for schematically illustrating the delivery base 3 and reception locations 7a and 7b. Herein, the reception locations 7a and 7b correspond to facilities such as an apartment building where the user lives, respectively. Each of the reception locations 7a and 7b has a standby region where the unmanned delivery vehicle 1 arriving from the delivery base 3 can stand by. Each of the reception locations 7a and 7b may have a plurality of standby regions apart from each other.

Figure 4:
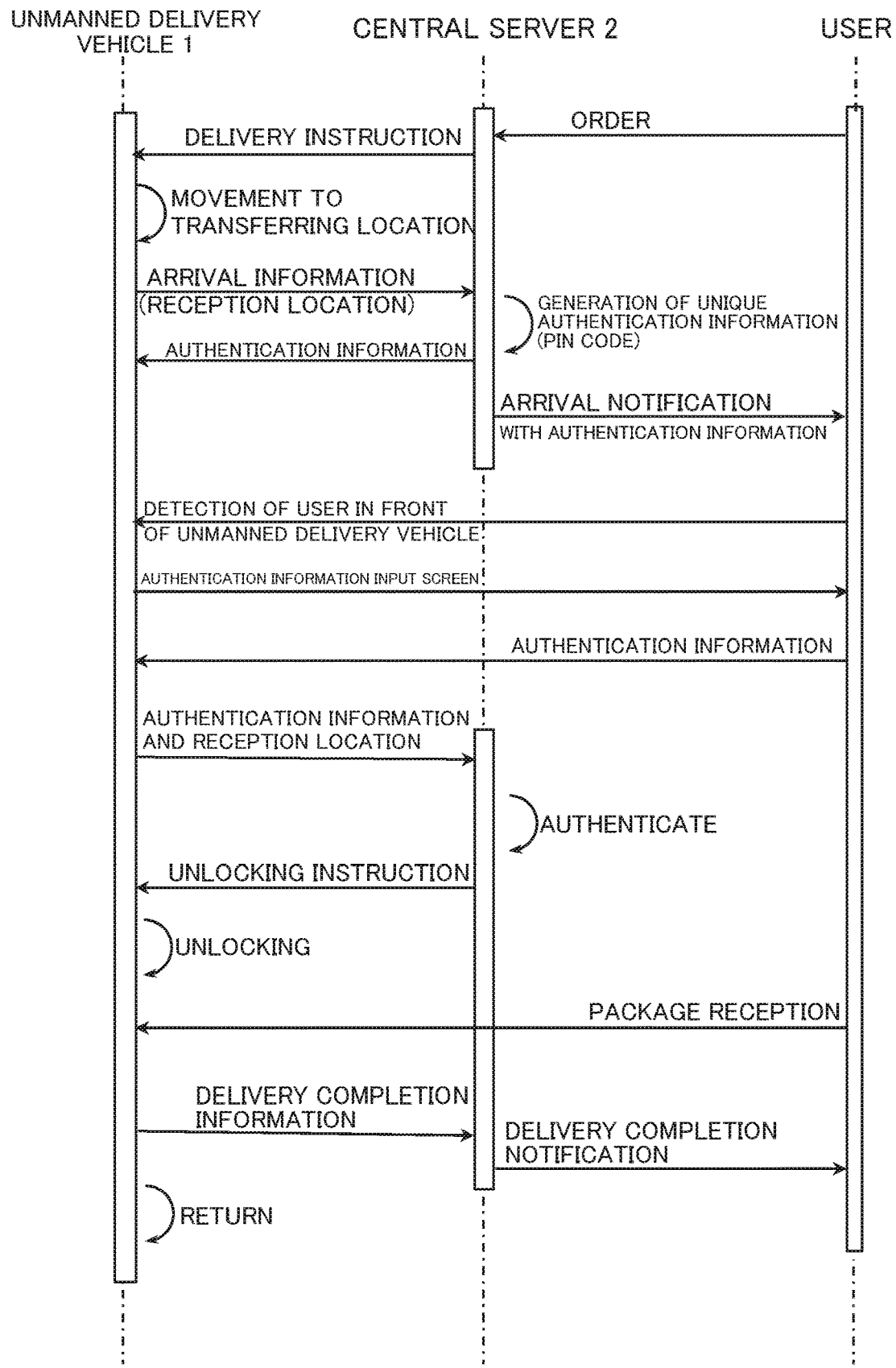
FIG. 4 is a sequence diagram for illustrating an operation of the delivery system.

FIG. 4 is a sequence diagram for illustrating an operation of the delivery system. FIG. 3 illustrates that the unmanned delivery vehicle 1 moves to the reception location, the user receives a package, and the delivery is completed.

First, the user orders a product from the central server 2, and the central server 2 generates delivery destination information indicating the delivery destination of the package including the ordered product. The delivery destination information includes information for identifying the user to be the delivery destination and information indicating the reception location where the package is transferred to the user. Further, the central server 2 transmits an instruction (delivery instruction) for delivering the package to the unmanned delivery vehicle 1 in order to deliver the package to the user. The central server 2 transmits, to the delivery base 3, an instruction to store the package in the unmanned delivery vehicle 1, and a staff member of the delivery base 3 stores the package in the storage compartment 16 of the unmanned delivery vehicle 1. Next, the unmanned delivery vehicle 1 moves toward the reception location (for example, entrance of the apartment building), and when the unmanned delivery vehicle 1 has arrived at the reception location specified in advance, the unmanned delivery vehicle 1 transmits arrival information to the central server 2. The arrival information includes vehicle body information for identifying the unmanned delivery vehicle 1 and information indicating the reception location.

When the central server 2 has received the arrival information, the central server 2 generates unique authentication information, and transmits the generated authentication information to the unmanned delivery vehicle 1. Moreover, the central server 2 transmits an arrival notification including the authentication information to the user (more strictly, device owned by user). The authentication information to be transmitted to the user is, for example, a PIN code or a passcode. The PIN code may be a six-digit number or alphanumeric characters. The passcode may be longer alphanumeric characters. Moreover, as the authentication information, image data of a two-dimensional code, for example, the QR code (trademark), may be transmitted. The unmanned delivery vehicle 1 receives the authentication information, and continues to wait at the reception location.

After that, when the user has approached the unmanned delivery vehicle 1, the unmanned delivery vehicle 1 detects the approach of the user, and displays an authentication information input screen on the display. When the user has input the authentication information to the input/output unit 14 of the unmanned delivery vehicle 1, the unmanned delivery vehicle 1 transmits, to the central server 2, information indicating the reception location and the authentication information.

The central server 2, which has received the authentication information and the reception location, confirms whether or not the authentication information is appropriate, and authenticates the user who has input the authentication information. After that, the central server 2 transmits, to the unmanned delivery vehicle 1 storing the package to be received by the user, an unlocking instruction to unlock the key to the door of the storage compartment 16 storing the package. Then, the unmanned delivery vehicle 1 unlocks the key to the storage compartment 16.

The user receives a package stored in the unlocked storage compartment 16. When the unmanned delivery vehicle 1 has detected the fact that the user has received the package, the unmanned delivery vehicle 1 transmits, to the central server 2, delivery completion information indicating completion of the delivery, and the central server 2 transmits a delivery completion notification to the user. After that, the unmanned delivery vehicle 1 returns to the delivery base 3.

Figure 5:
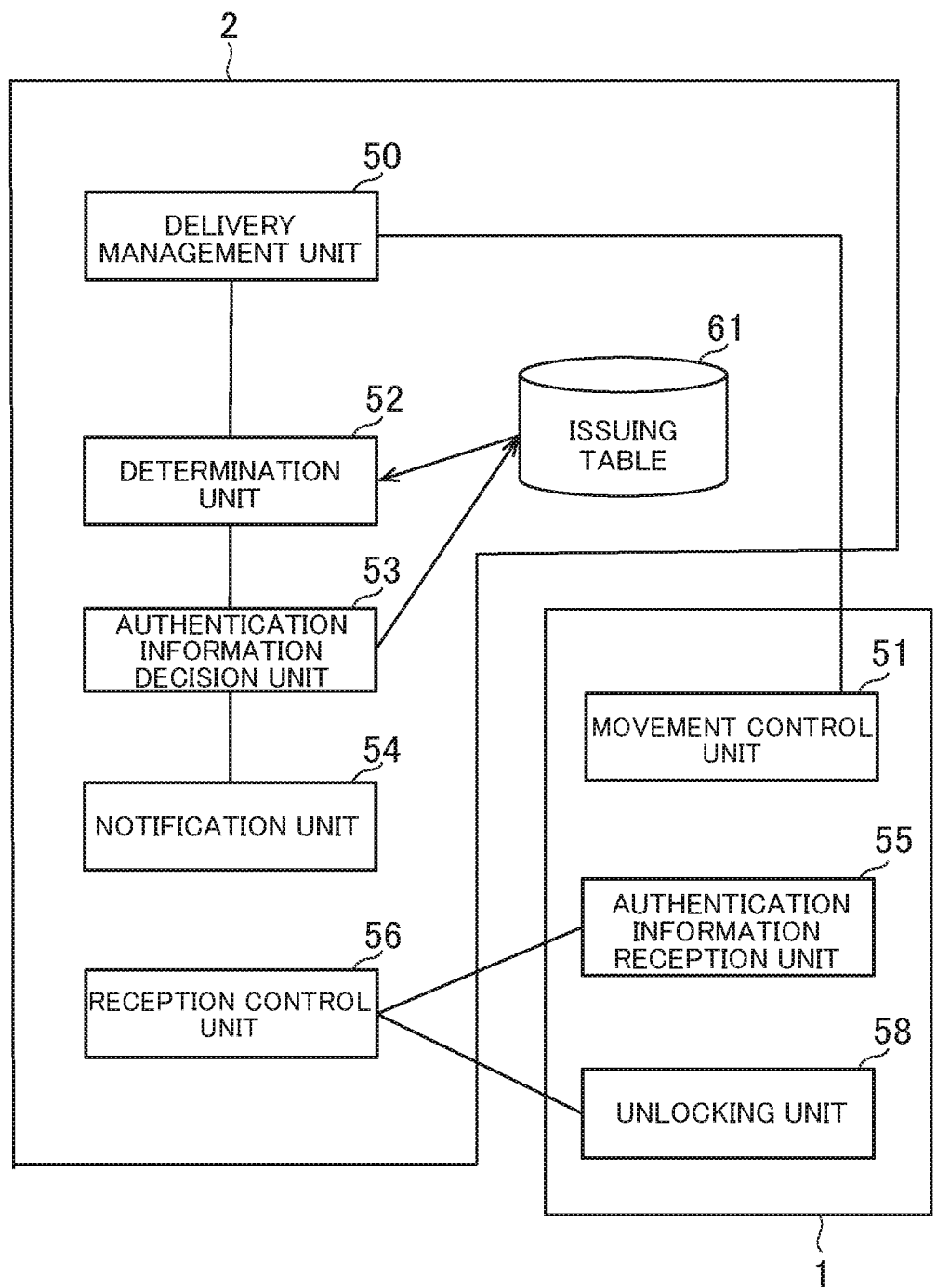
FIG. 5 is a block diagram for illustrating a functional configuration of the delivery system.

Now, description is given of processing of the delivery system more in detail. FIG. 5 is a block diagram for illustrating functions to be implemented by the delivery system. In at least one embodiment, the package delivery system includes, from the functional point of view, a delivery management unit 50, a movement control unit 51, a determination unit 52, an authentication information decision unit 53, a notification unit 54, an authentication information reception unit 55, a reception control unit 56, an unlocking unit 58, and an issuing table 61.

The delivery management unit 50, the determination unit 52, the authentication information decision unit 53, the notification unit 54, and the reception control unit 56 are implemented by the processor 21 included in the central server 2 executing programs stored in the memory 22 to control the communication unit 23. Those functions may be implemented by the processors 21 included in the plurality of servers executing programs. The issuing table 61 is stored in the memory 22. In the issuing table 61, the already issued authentication information is stored in association with the user who is an issuing destination of the authentication information. The issuing table 61 may be stored in the server on which the database management system operates, unlike the central server 2.

The movement control unit 51, the authentication information reception unit 55, and the unlocking unit 58 are implemented by the processor 11 included in the unmanned delivery vehicle 1 executing programs stored in the memory 12 to control the communication unit 13, the input/output unit 14, the sensor unit 15, and the key controller 17.

The delivery management unit 50 of the central server 2 acquires the delivery destination information indicating the user who is the delivery destination of the package and the reception location of the package. The delivery management unit 50 instructs the delivery base 3 and the unmanned delivery vehicle 1 to deliver the package addressed to the user based on the delivery destination information. More specifically, when the package (the package addressed to the user) including a product ordered by the user exists in the delivery base 3, the delivery management unit 50 transmits, to the package delivery base 3, an instruction to store the package addressed to the user in the storage compartment 16 of the unmanned delivery vehicle 1, and further transmits, to the unmanned delivery vehicle 1, an instruction (delivery instruction) to move to the reception location after storing the package in the unmanned delivery vehicle 1.

The movement control unit 51 of the unmanned delivery vehicle 1 is configured to control movement of the unmanned delivery vehicle 1 from the delivery base 3 to the reception location and movement of the unmanned delivery vehicle 1 from the reception location to the delivery base 3 based on data acquired by the lidar or a GPS sensor of the unmanned delivery vehicle 1. The movement control unit 51 may be configured to control the movement based on the data acquired by the camera. A part of functions of the movement control unit 51 may be implemented by a server computer. When the unmanned delivery vehicle 1 has arrived at the reception location at which the unmanned delivery vehicle 1 waits for the arrival of the user, the movement control unit 51 transmits, to the central server 2, arrival information including the reception location at which the unmanned delivery vehicle 1 is currently waiting.

The delivery management unit 50 acquires, from the unmanned delivery vehicle 1, the arrival information including the reception location at which the package transported by the unmanned delivery vehicle 1 is to be transferred to the user who is the delivery destination.

The determination unit 52 of the central server 2 determines whether to use the already issued authentication information to receive the package based on the user who is the delivery destination and the authentication information stored in the issuing table 61. The issuing table 61 stores the already issued authentication information in association with a user who is an issuing destination of the authentication information.

The authentication information decision unit 53 of the central server 2 determines the authentication information used by the user to receive the package based on the determination of the determination unit 52. More specifically, when it is determined that the already issued authentication information is not used for receiving the package, the authentication information decision unit 53 issues new authentication information as the authentication information used for receiving the package, and stores the issued authentication information in the issuing table 61 in association with the user who is the delivery destination. On the other hand, when it is determined that the already issued authentication information is used for receiving the package, the authentication information decision unit 53 acquires the authentication information stored in the issuing table 61 as the authentication information used for receiving the package.

The authentication information is used to authenticate the user who comes to receive the package. The user who is the delivery destination and comes to receive the package inputs the determined authentication information to the unmanned delivery vehicle 1 at the reception location. The authentication information is information that can be used to authenticate the user even when the authentication information is used alone without information for identifying the user.

In addition, the authentication information decision unit 53 sets information for restricting issuing of the issued authentication information for the reception location later, to thereby restrict issuing of the same authentication information as at least one piece of authentication information restricted in issuing for the reception location. For example, the authentication information decision unit 53 sets the authentication information to be issued to an issuing inhibition state for the reception location, and issues the authentication information different from at least one piece of authentication information in the issuing inhibition state for the reception location. A detailed description is later given of the issuing inhibition state. It should be understood that, when a plurality of packages are to be delivered to different users, the authentication information decision unit 53 issues pieces of authentication information different from one another, and further sets those pieces of authentication information to the issuing inhibition state.

The notification unit 54 of the central server 2 notifies the user of the issued authentication information (specifically, transmits authentication information to device owned by user). In this case, the notification unit 54 may notify the user who is the delivery destination and the associated users (for example, users among family living together with the user) associated with the user of the issued authentication information, if necessary. The notification unit 54 may notify the user of the authentication information, information indicating whether or not the authentication information is the same as the already issued authentication information, and information indicating whether or not the authentication information has been transmitted to the associated user.

The authentication information reception unit 55 of the unmanned delivery vehicle 1 is configured to receive the authentication information input from the user through the input/output unit 14. Further, the authentication information reception unit 55 is configured to transmit the received authentication information to the central server 2.

When the user who is the delivery destination inputs the authentication information used for receiving the package, the reception control unit 56 of the central server 2 controls so that the package is transferred to the user. More specifically, the reception control unit 56 authenticates the user based on the received authentication information, and when the user is authenticated as appropriate, the reception control unit 56 transmits an instruction (unlocking instruction) to unlock the key (more strictly, key of door) of the storage compartment 16 storing the package addressed to the user.

The unlocking unit 58 of the unmanned delivery vehicle 1 is configured to receive the unlocking instruction, and unlock the key to the storage compartment 16 storing the package addressed to the user based on the unlocking instruction. Moreover, the unlocking unit 58 detects, based on the output of the sensor unit 15, whether or not the package in the storage compartment 16 has been removed (which means whether or not user has received package). When the unlocking unit 58 has detected the fact that the user has received the package, the unlocking unit 58 transmits, to the central server 2, delivery completion information indicating the completion of the delivery of the package to the user.

Figure 6:
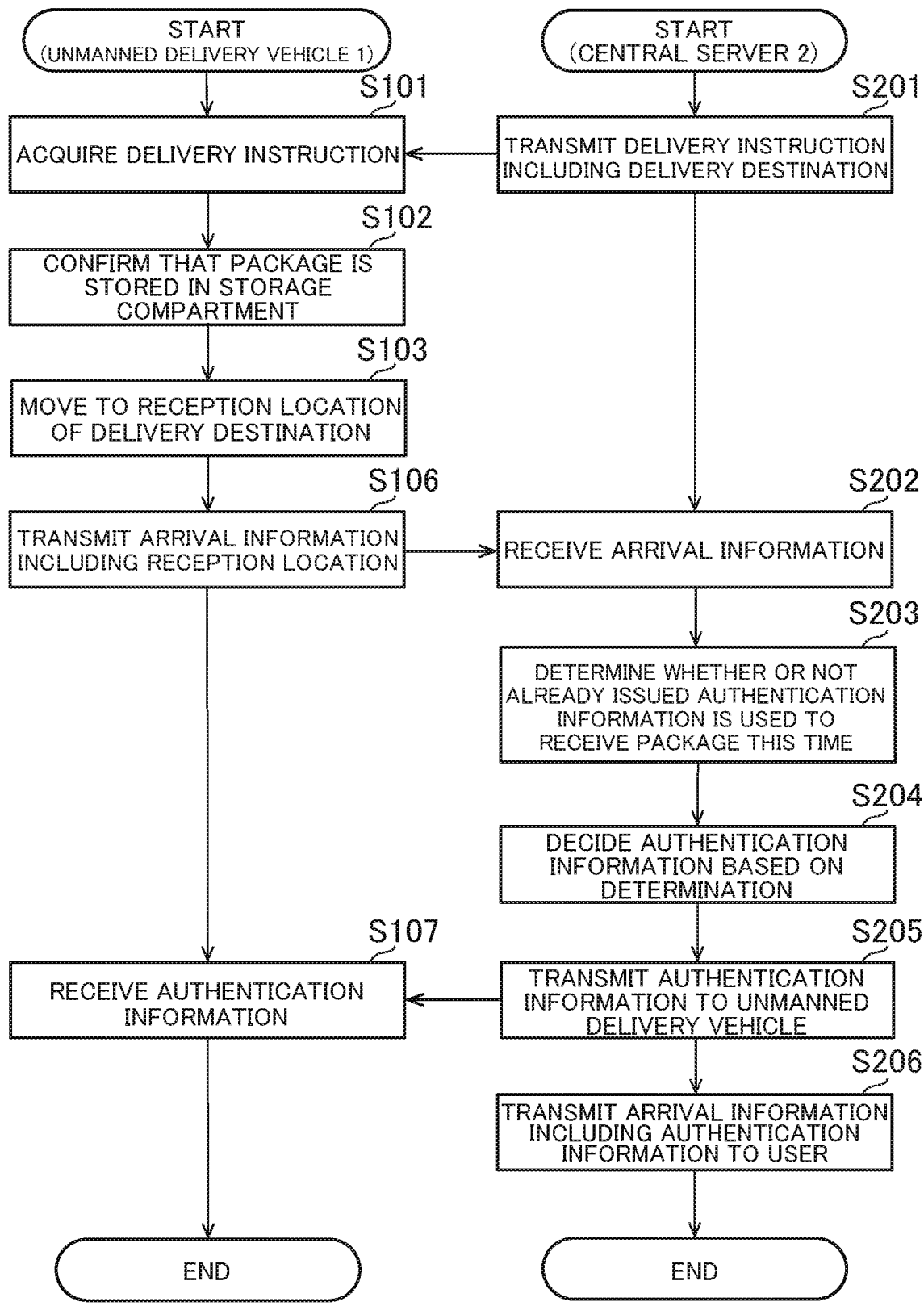
FIG. 6 is a flowchart for illustrating an example of processing to be executed by the unmanned delivery vehicle and a central server.

FIG. 6 is a flowchart for illustrating an example of processing to be executed by the unmanned delivery vehicle 1 heading to the reception location and the central server 2. The processing illustrated in FIG. 6 corresponds to a part up to the transmission of the arrival notification of the operation illustrated in the sequence diagram of FIG. 4.

First, the delivery management unit 50 of the central server 2 transmits a delivery instruction including delivery destination information to the unmanned delivery vehicle 1 (Step S201). The delivery management unit 50 stores, in the memory 22, a user, a package, the unmanned delivery vehicle 1 storing the package, and the reception location of the package in association with one another. The movement control unit 51 of the unmanned delivery vehicle 1 acquires a delivery instruction (Step S101). Further, the movement control unit 51 of the unmanned delivery vehicle 1 confirms the fact that a package indicated by the delivery instruction is stored in the storage compartment 16 at the delivery base 3 (Step S102), and moves the unmanned delivery vehicle 1 to the reception location (Step S103). A publicly known technology, such as unmanned driving or automatic delivery, may be used for control of the movement, and a detailed description of the control is omitted.

When the unmanned delivery vehicle 1 has approached or arrived at the reception location, the movement control unit 51 transmits, to the central server 2, the arrival information including the reception location and the vehicle body information (Step S106). The delivery management unit 50 of the central server 2 receives the arrival information (Step S202).

The determination unit 52 of the central server 2 determines whether or not to use the already issued authentication information for receiving the package based on the authentication information stored in the issuing table 61 and the user who is the delivery destination (Step S203). The authentication information decision unit 53 decides the authentication information based on the determination (Step S204). The authentication information decision unit 53 decides the authentication information that is not a duplicate of other pieces of authentication information generated to other users for the same reception location as the authentication information used for reception. Description is later given of details of processing of deciding the authentication information.

When the authentication information is issued, the authentication information decision unit 53 transmits the authentication information to the unmanned delivery vehicle 1 that has transmitted the arrival information (Step S205). The unmanned delivery vehicle 1 receives the authentication information (Step S107), and stores, in the memory 12, the received authentication information and information for identifying the storage compartment 16 storing the package in association with each other.

Moreover, the notification unit 54 transmits the arrival information including the authentication information to the user being the delivery destination (Step S206).

Figure 7:
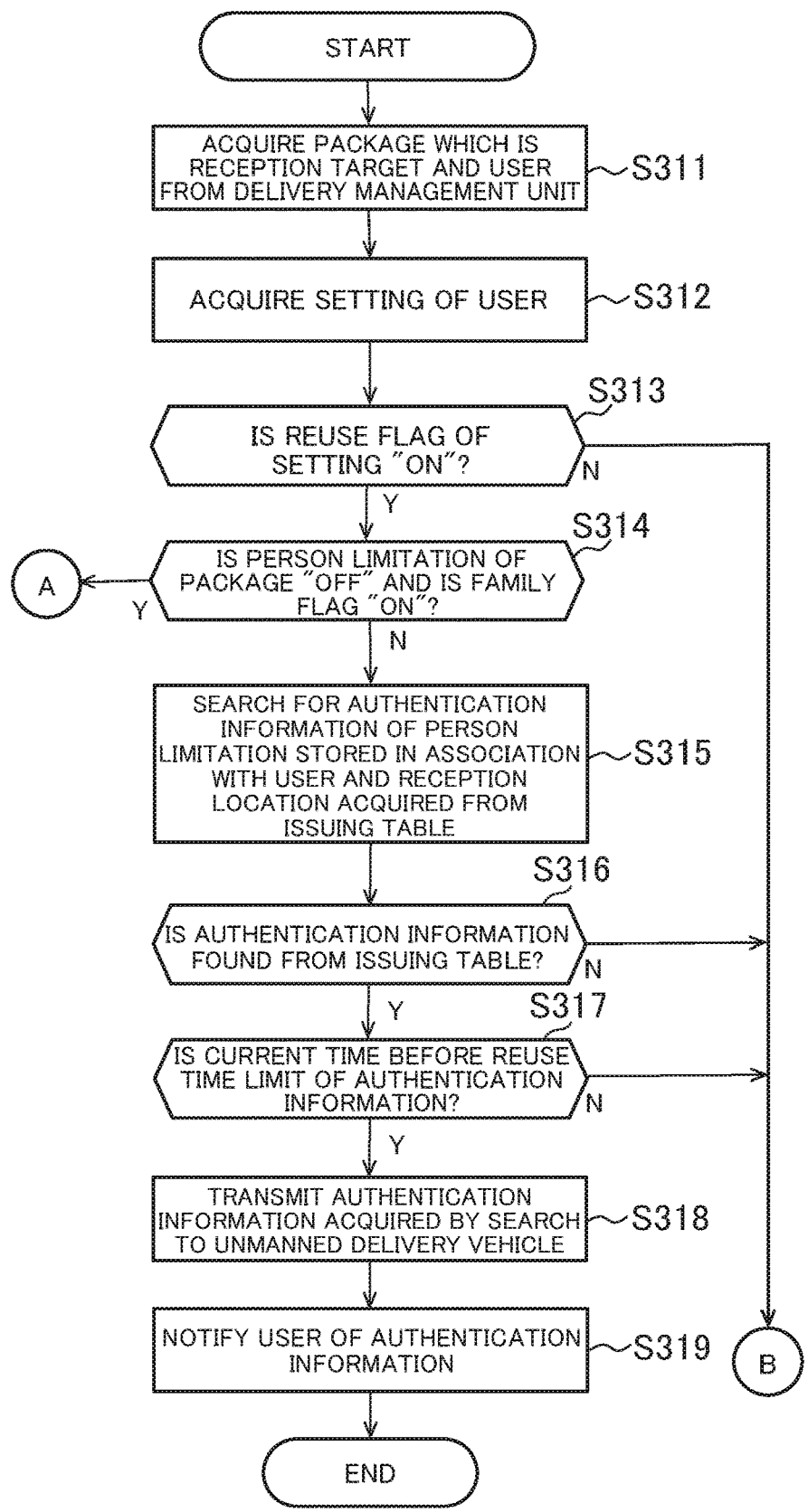
FIG. 7 is a flowchart for illustrating an example of processing of a determination unit, an authentication information decision unit, and a notification unit.
Figure 8:
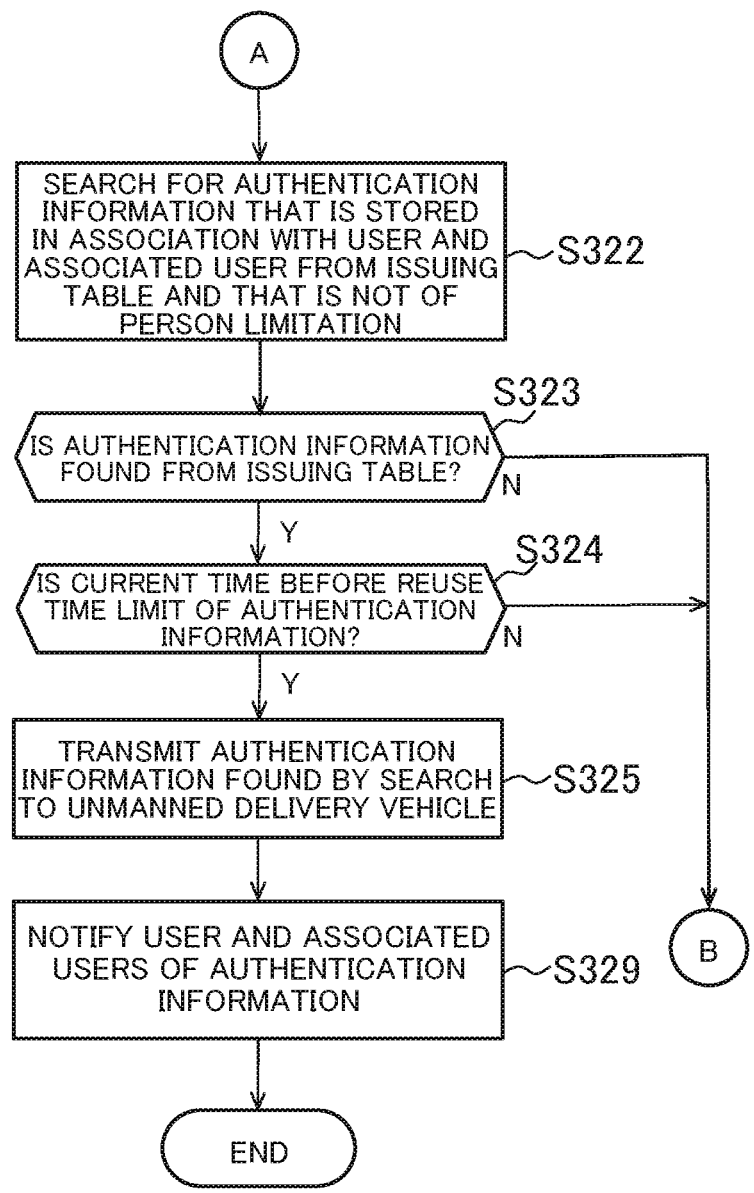
FIG. 8 is a flowchart for illustrating an example of processing of the determination unit, the authentication information decision unit, and the notification unit.
Figure 9:
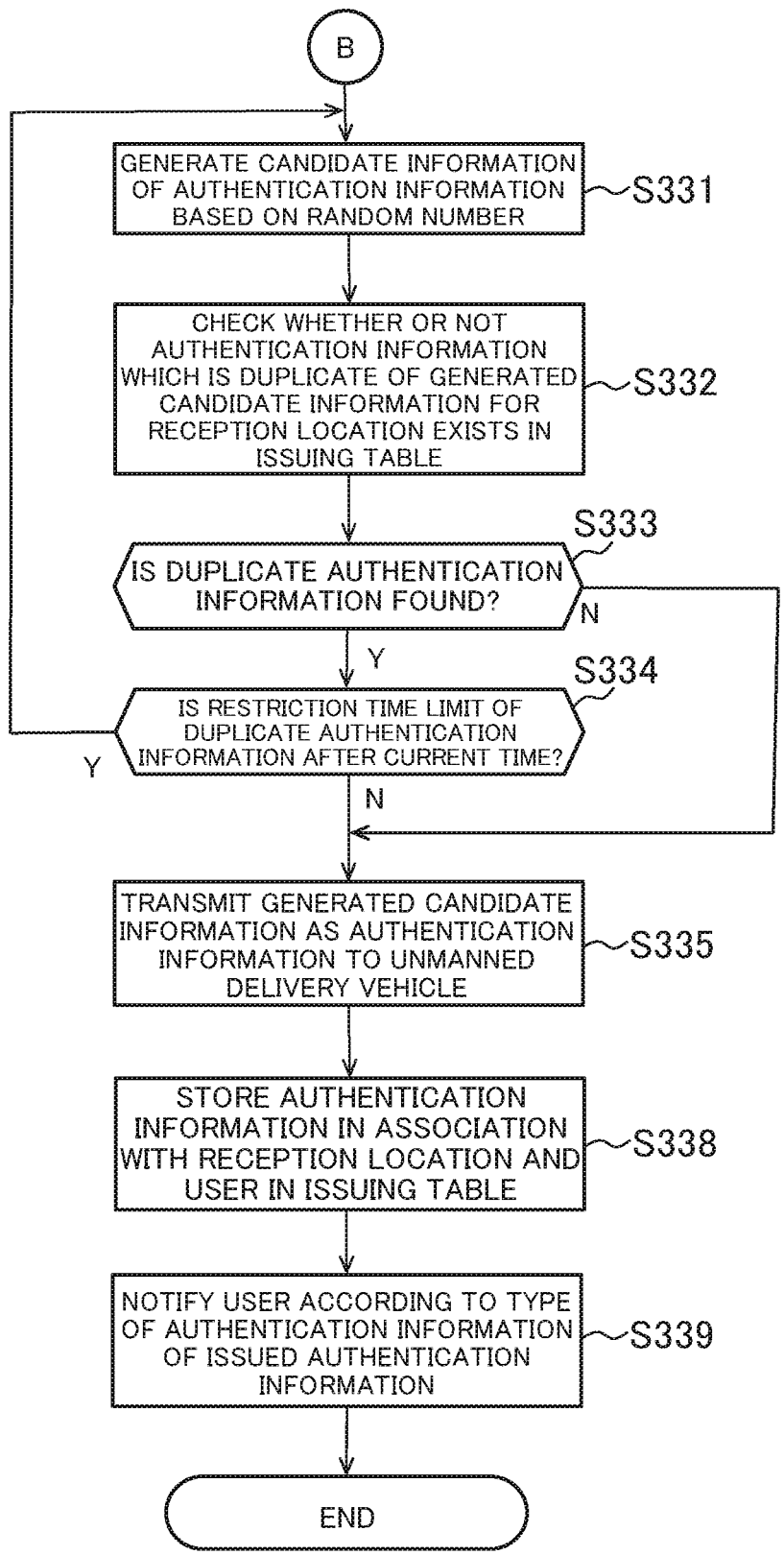
FIG. 9 is a flowchart for illustrating an example of processing of the determination unit, the authentication information decision unit, and the notification unit.

Description is now given of details of the processing of Steps S203 to S205. FIGS. 7 to 9 are flowcharts for illustrating an example of processing of the determination unit 52, the authentication information decision unit 53, and the notification unit 54. The processing illustrated in FIGS. 7 to 9 is executed when the unmanned delivery vehicle 1 arrives at or near the reception location. More specifically, the delivery management unit 50 receives the arrival information, acquires the package to be transferred at the reception location and the user who is the delivery destination of the package based on the vehicle body information included in the received arrival information and the information stored in the memory 22 in Step S201, and then the processes illustrated in FIGS. 7 to 9 are executed. It is noted that the processing illustrated in FIGS. 7 to 9 may be executed, for example, at the timing when the package is stored in the storage compartment 16 of the unmanned delivery vehicle 1. In this case, the processing is executed after the delivery management unit 50 acquires the reception location of the package stored in the storage compartment 16 and the user who is the delivery destination.

First, the determination unit 52 acquires the package to be transferred at the reception location and the user who is the delivery destination of the package from the delivery management unit 50 (Step S311). Further, the determination unit 52 acquires the settings (particularly the reuse flag and the family flag) of the user who receives the package from the user table (Step S312).

FIG. 10 is a table for illustrating an example of data stored in the user table. In the example of FIG. 10, each piece of user information stored in the user table includes a user ID, a delivery destination address and a delivery destination room number of a user, associated users, the reuse flag, and the family flag. The delivery destination address is information indicating a building in which the user lives. The delivery destination room number is information for identifying a room in the building in which the user lives. The address and the room number of the delivery destination are separated for the convenience of description, but may be combined into the same field. The associated user is a user ID of the user (for example, a user who lives in the same place) who can receive the package in place of the user. The reuse flag is information indicating whether or not authentication information having been issued once is allowed to be reused for the reception location and the user for a certain period of time. In the example of FIG. 10, "ON" indicates that the authentication information can be reused. Moreover, the family flag is information indicating whether or not authentication information having been issued to the associated users before is allowed to be reused for a certain period of time. In the example of FIG. 10, "ON" indicates that the authentication information having been issued to the associated users can be reused.

When the settings for the user have been acquired, the determination unit 52 determines whether the reuse flag of the settings is "ON" or "OFF" (Step S313). When the reuse flag of the setting is "OFF" (N in Step S313), the processing of Steps S314 to S319 described below is not executed, and the processing starting from Step S331 of FIG. 9 is executed.

Meanwhile, when the reuse flag of the setting is "ON" (Y in Step S313), the determination unit 52 determines whether the person limitation of the package is "OFF" and the family flag is "ON" (Step S314). When the person limitation of the package is "OFF" and the family flag is "ON" (Y in Step S314), the processing of Steps S315 to S319 described below is not executed, and the processing starting from Step S322 in FIG. 8 is executed.

The person limitation of the package is an attribute to the package and is an attribute that prohibits anyone other than the person from receiving the package. When the package is, for example, a so-called confidential document or a work-related package, the person limitation of the package may be set to "ON".

When the person limitation of the package is "ON" or the family flag is "OFF" (N in Step S314), the determination unit 52 searches, from the issuing table 61, for the authentication information stored in association with the user who is the delivery destination, the reception location, the person limitation flag which is set to "ON" (Step S315). When the person limitation of the package is "ON" or the family flag is "OFF", the already issued authentication information (authentication information of the person limitation) only to that user can be used to receive the package, and the determination unit 52 confirms whether the authentication information can be reused in Step S315 or later.

FIG. 11 is a table for illustrating an example of data stored in the issuing table 61. At least one piece of issuing information is stored in the issuing table 61. Each piece of the issuing information includes a reception location, authentication information, issued date and time of the authentication information, a user ID, a reuse time limit, a restriction time limit, a delivery vehicle, and a person limitation flag. The user ID is to identify a user to be authenticated by the authentication information so as to receive a package. The reuse time limit indicates an end of a period in which the authentication information can repeatedly be issued to the same user or associated users. The restriction time limit indicates an end of a period in which the issuing of the authentication information is restricted. The authentication information is not issued in a period before the restriction time limit. In particular, the authentication information is issued to no user after the reuse time limit and before the restriction time limit. In FIG. 11, each of the reuse time limit and the restriction time limit is represented as a date set in accordance with the issued date, but may be a date and a time obtained by adding a predetermined period of time to the issued date and time. The person limitation flag is information indicating whether or not the issued authentication information is used only by the user who is the delivery destination.

In Step S315, the determination unit 52 searches for the issuing information by using, as the search condition, the user receiving the package, the reception location, and the person limitation flag for which "ON" is set. In at least one embodiment, the determination unit 52 searches for the issuing information directly from the issuing table 61 stored in the memory 22. The determination unit 52 may allow the database management system to search for the issuing information in the issuing table 61.

When the issuing information (including the authentication information) satisfying the search condition is found in the issuing table 61 (Y in Step S316), and the current time is before the reuse time limit of the authentication information included in the issuing information (Y in Step S317), the determination unit 52 determines that the already issued authentication information is used for receiving the package. Then, the authentication information decision unit 53 decides the authentication information found by the search as the authentication information to be input by the user for receiving the package this time and transmits the authentication information to the unmanned delivery vehicle 1 (Step S318). Furthermore, the notification unit 54 notifies the user of the authentication information together with information indicating that the authentication information is of the person limitation and is the same as the previously notified authentication information (Step S319), and ends the process. In this case, the authentication information decision unit 53 may further update fields, for example, the delivery vehicle of the issuing information of the issuing table 61.

When the issuing information satisfying the search condition has not been found (N in Step S316) or when the current time is after the reuse time limit of the authentication information included in the issuing information (N in Step S317), the determination unit 52 determines that the already issued authentication information is not used for receiving the package, and the processing starting from Step S331 is executed.

When the reuse flag is set to "ON" for the user by the process described so far, and there is authentication information set to the issuing inhibition state for the user who is the delivery destination at the current reception location, the authentication information decision unit 53 decides the already issued authentication information as the authentication information to be input to the user at the reception location as the authentication information used for receiving the package this time. However, the authentication information of which reuse time limit has already passed will not be used.

In reception of a package, the restricted time period from issuing of the authentication information to permitting the use of the authentication information for a completely different authentication is likely to be longer than that of a general one-time password (for example, 3 to 10 days). For this reason, the authentication information can be reused for other receptions of the same user without significantly increasing the time period. The utilization efficiency of the authentication information can be improved by reusing the authentication information. Particularly, when the reception of a plurality of packages occurs in a short period of time, the utilization efficiency can be greatly improved.

In the example of FIG. 7, the reuse time limit is checked, but, instead, the issued date and time may be checked, to thereby determine whether or not the time limit has passed. Moreover, for example, issuing information of which reuse time limit has passed may be extracted periodically, for example, once a day, and a flag indicating that the time limit has passed may be set to the extracted issuing information. Then, processing of confirming the flag may be executed in Step S317.

Steps S322 to S329 are processing for enabling a cohabitant such as a family member to receive the package by using the authentication information previously issued to any of the users.

The determination unit 52 searches, from the issuing table 61, for authentication information that is stored in association with the reception location and the user who receives the package or who is the associated user, and that is not of the person limitation (Step S322). More specifically, the determination unit 52 searches for the issuing information in the issuing table 61 that satisfies the following search conditions. The search conditions are that the ID of the user who receives the package or associated user is stored in field of the user ID, the reception location of this package is stored in the field of the reception location, and the person limitation flag is not set to "ON.".

When the issuing information (including the authentication information) satisfying the search condition is found in the issuing table 61 (Y in Step S323), and the current time is before the reuse time limit of the authentication information included in the issuing information (Y in Step S324), the determination unit 52 determines that the already issued authentication information is to be used for receiving the package this time, and the authentication information decision unit 53 acquires the authentication information found by the search as the authentication information which is to be input by the user for receiving the package this time. Then, the authentication information decision unit 53 transmits the acquired authentication information to the unmanned delivery vehicle 1 (Step S325). The notification unit 54 notifies the user and the associated user of the authentication information together with the information indicating that the authentication information is the same as the previously notified authentication information and is also notified to the associated user (Step S329), and the processing related to FIGS. 7 to 9 is completed. Herein, the authentication information decision unit 53 may further update the field such as the delivery vehicle of the issuing information in the issuing table 61.

When the issuing information satisfying the search condition is not found (N in Step S323) or the current time is later than the reuse time limit of the authentication information included in the issuing information (N in Step S324), the determination unit 52 determines that the already issued authentication information is not used for receiving the package, and the processing starting from Step S331 is executed.

When the family flag is set to "ON" for the user by the processing of Steps S322 to S329 and the already issued authentication information to the user, associated with the user who is the delivery destination, exists at the reception location, the authentication information decision unit 53 decides the already issued authentication information as the authentication information to be input by the user for the package this time. However, authentication information is not issued again after the reuse time limit thereof. Accordingly, the same authentication information can be reused for other users who can receive each other's packages such as a family member and the use efficiency of the authentication information can be further improved. Further, in Step S314 of FIG. 7, by changing the process according to whether or not the reception of associated users (for example, family members) is permitted in the user settings, it is possible to prevent, for example, unexpected reception between the family members. Furthermore, by confirming that the person limitation is set as the attribute of the package in S314, the user can receive the package more safely.

In the example of FIG. 8, the reuse time limit is checked, but instead, it may be determined whether the time limit has passed by checking the issuing date and time. Moreover, for example, issuing information that has passed the reuse time limit may be extracted periodically, for example, once a day, and a flag indicating that the time limit has passed may be set to the extracted issuing information. Then processing of confirming the flag in Step S324 may be performed.

When the authentication information has not been decided by the processing described above, the authentication information decision unit 53 generates candidate information for the authentication information based on a random number (Step S331). The candidate information is a random number. The authentication information decision unit 53 checks whether or not the authentication information which is a duplicate of the generated candidate information exists for the current reception location in the issuing table 61 (Step S332). More specifically, the authentication information decision unit 53 searches for issuing information including the current reception location stored in the field of the reception location and the candidate information stored in the field of the authentication information, to determine whether or not the issuing information is found.

When duplicate authentication information with respect to the reception location has not been found (N in Step S333), the candidate information is in a state in which the candidate information can be issued as authentication information, and processing starting from Step S335 is thus executed. Meanwhile, when duplicate authentication information with respect to the reception location has been found (Y in Step S333), the authentication information decision unit 53 determines whether or not the restriction time limit of the found authentication information is after the current time (Step S334). When the restriction time limit is after the current time (Y in Step S334), the candidate information cannot be issued for the reception location, and hence the processing starting from Step S331 is repeated, to thereby generate another piece of candidate information. When the restriction time limit is not after the current time (N in Step S334), the candidate information is in the state in which the candidate information can be issued as authentication information, and hence the authentication information decision unit 53 thus executes the processing starting from Step S335.

In Step S355, the authentication information decision unit 53 issues, to the user, candidate information as authentication information and transmits the authentication information to the unmanned delivery vehicle 1. After that, the authentication information decision unit 53 stores, in the issuing table 61, the authentication information in association with the current reception location and the user (Step S338). Specifically, the authentication information decision unit 53 creates the issuing information including the reception location, the issued authentication information, the issued date and time including the current date and time, the user ID of the user whose authentication information is issued, and the person limitation flag, and adds the issuing information to the issuing table 61. The person limitation flag is set to "ON" when the person limitation of the package is "ON" or the family flag is "OFF", and is set to "OFF" otherwise.

When the authentication information is issued, the notification unit 54 notifies the user of the issued authentication information according to the type of the authentication information (Step S339). More specifically, when the person limitation of the package is "ON" or the family flag is "OFF", the notification unit 54 notifies only the user who is the delivery destination of the package of the authentication information together with the information indicating that the notified authentication information is newly issued authentication information and is of the person limitation. When the person limitation of the package is "OFF" and the family flag is "ON", the notification unit 54 notifies the user and the associated user of the authentication information together with the information indicating that the notified authentication information is newly issued authentication information and the associated user is also notified of.

Regarding Steps S332 to S334, the authentication information decision unit 53 may execute periodically, for example, once a day, processing of deleting issuing information after the restriction time limits, to thereby release the state in which authentication information cannot be issued. In this case, in Step S332, the reception location and the authentication information are set in advance as a primary key for uniquely identifying the issuing information in the issuing table 61, and the duplication may be checked based on whether or not an error occurs at the time of addition of the issuing information including the current reception location in the field of the reception location and the candidate information in the field of the authentication information. Moreover, when the duplication has been found in Step S333, the processing starting from Step S331 may be repeated.

Through the processing from Step S331 to Step S333, the same authentication information can be prevented from being issued for the same reception location. For example, in FIG. 11, issuing information having authentication information "654321" is issued so as to prevent issuing information having the same authentication information (for example, "123456") and the same reception location R1 from being issued.

In addition, by the processing of Steps S331 to S333, the authentication information is not issued to another user until the restriction time limit of the certain authentication information has passed. From a different point of view, the processing is provided so that, when the authentication information is issued to the user who receives a certain package and, after that, the authentication information is issued to a user different from that user and associated users, the determination unit 52 is allowed to be prevented from determining that the authentication information is used for receiving the package.

FIG. 12 is a table for illustrating another example of the data stored in the issuing table 61. Authentication information "123456" was issued to a user "AAA" for the reception location "R1" on March 1, but authentication information "123456" was issued to another user "DDD" for the reception location "R1" on March 4, on which the restriction time limit had passed. In addition to the authentication information "123456" that can be shared with associated users, with respect to the user "AAA", the authentication information "133333" of the person limitation is issued.

In such a case where plural deliveries are performed in a certain period of time, the number of pieces of authentication information to be issued to the users can be reduced by setting the reuse time limit while reducing a fear in that pieces of authentication information are mixed up. As a result, the finite information amount with respect to the authentication information can effectively be used. Moreover, the finite information amount of the authentication information can effectively be used by issuing the same authentication information to the associated users (for example, users living in the same residence). Further, packages for plural users can be received at once, and a load on the users can be reduced in the reception of the packages.

Yet further, by setting a period between a time limit (for example, reuse time limit) until which the authentication information can actually be used and the restriction time limit, it is possible to suppress an occurrence of such a problem that another user inputs old authentication information by mistake, and a package that should not be passed is passed to the other user.

Figure 13:
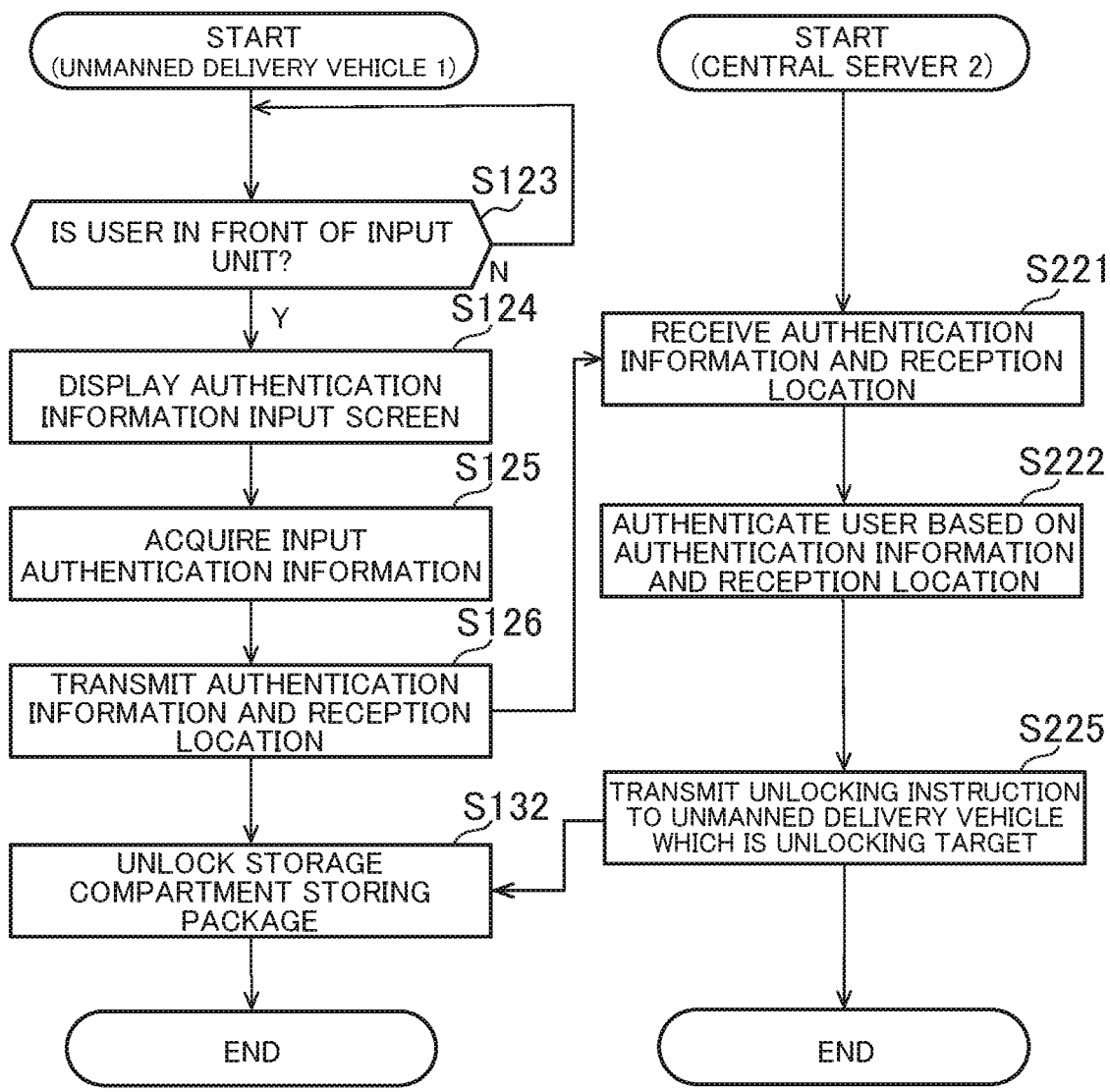
FIG. 13 is a flowchart for illustrating an example of processing to be executed by the unmanned delivery vehicle and the central server.

FIG. 13 is a flowchart for illustrating an example of processing to be executed by the unmanned delivery vehicle 1 having started to wait at a reception location and the central server 2. In FIG. 13, there is illustrated processing that is executed by the unmanned delivery vehicle 1 and the central server 2 and relates to input of a reception code by a user, unlocking, and completion of delivery.

First, the authentication information reception unit 55 determines whether or not the user is in front of the touch panel of the input/output unit 14 (Step S123). The authentication information reception unit 55 may determine whether or not the user is in front of the input/output unit 14 depending on whether or not the touch panel has been pressed, or based on a result of detection by an infrared sensor or the lidar of the sensor unit 15. When the user is not in front of the input/output unit 14 (N in Step S123), the processing in Step S123 is repeated.

When the user is in front of the input/output unit 14 (Y in Step S123), the authentication information reception unit 55 displays an authentication information input screen on the display of the input/output unit 14 (Step S124). After that, when the user who has recognized the authentication information input screen has input the reception code, the authentication information reception unit 55 acquires the authentication information input from the input/output unit 14 (Step S125). The authentication information reception unit 55 may acquire the PIN code input on the touch panel as the authentication information. When the authentication information reception unit 55 has acquired the authentication information, the authentication information reception unit 55 transmits the authentication information and the reception location to the central server 2 (Step S126). Instead of the authentication information, information (for example, hash value) obtained by processing the authentication information may be transmitted.

The reception control unit 56 of the central server 2 receives the authentication information and the reception location via the communication unit 23 (Step S221). The reception control unit 56 authenticates the user based on the received authentication information and the reception location (Step S222). Moreover, when the user has been authenticated, the reception control unit 56 transmits the unlocking instruction to unlock the storage compartment 16 being the unlocking target to the unmanned delivery vehicle 1 being the unlocking target (Step S225). The unlocking instruction includes information indicating the storage compartment 16 being the unlocking target (for example, identification information on storage compartment 16 or information for identifying user who is to receive package).

The unlocking unit 58 of the unmanned delivery vehicle 1 receives the unlocking instruction, and unlocks the door of the storage compartment 16 storing a package to be delivered to the user (Step S132). The unmanned delivery vehicle 1 may detect the reception of the package by the user, to thereby transmit, to the central server 2, the delivery completion information indicating the completion of the delivery to the user, which is not illustrated in FIG. 13. As described above, the user uses the issued authentication information, to thereby be able to receive the package.

The processing of the reception control unit 56 illustrated in FIG. 13 may be executed by the unmanned delivery vehicle 1. For example, the reception control unit 56 arranged in the unmanned delivery vehicle 1 may authenticate the user based on the authentication information received, in advance, from the central server 2 and the authentication information input from the user and further, when the user is authenticated, the key controller 17 may be controlled so that the reception control unit 56 unlocks the storage compartment 16 that stores the package addressed to the user.

Although the transfer of the package using the unmanned delivery vehicle 1 has been described so far, the present invention is not limited thereto. For example, the storage compartment 16 may be provided in a facility fixedly installed at a certain place, and the user may go to the place to receive the package.

Figure 14:
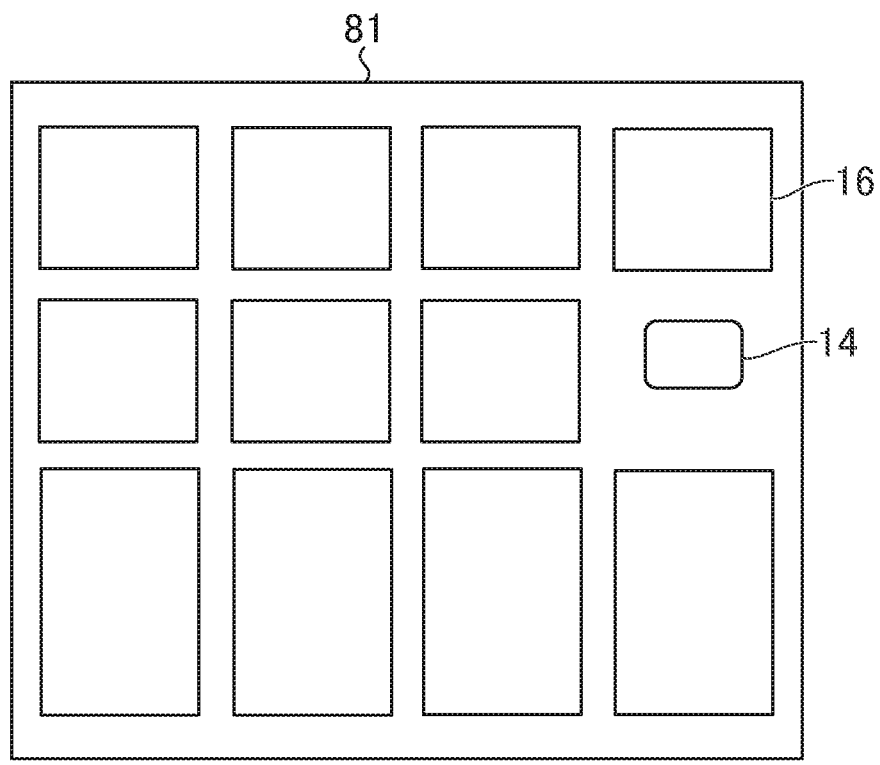
FIG. 14 is a diagram for illustrating an example of a delivery box.

FIG. 14 is a diagram for illustrating an example of a delivery box 81. The delivery box 81 is arranged, for example, at the entrance of a station or an apartment building. Like the unmanned delivery vehicle 1, the delivery box 81 includes a storage compartment 16 for storing package and an input/output unit 14 and has functions corresponding to the authentication information reception unit 55 and the unlocking unit 58.

The package is, for example, moved by a truck from the delivery base 3 and stored in the delivery box 81 by the staff on the truck. For this reason, the processing of Steps S101 to S103 of FIG. 6 is not executed on the delivery box 81. Further, instead of transmitting and receiving the arrival information in Steps S106 and S202 in FIG. 6, the storage information indicating that the package has been stored may be transmitted and received. The storage information may include information for identifying the package and information indicating the reception location where the delivery box 81 is installed. The processing illustrated in Step S203 may be executed at the timing when the package is stored in the delivery box 81 or the timing when the package departs from the delivery base 3 toward the delivery box 81. Further, the processing starting from Step S311 included in Step S203 may be executed after the delivery management unit 50 acquires the user who is the delivery destination of the package based on the information for identifying the package. When the communication line is stable, the processing of Steps S107 and S204 may not be performed.

It is noted that the delivery box 81 may be portable. In this case, the delivery box 81 may be transported by a truck or the like and may be arranged in front of the entrance of the apartment building or the like.

Figure 15:
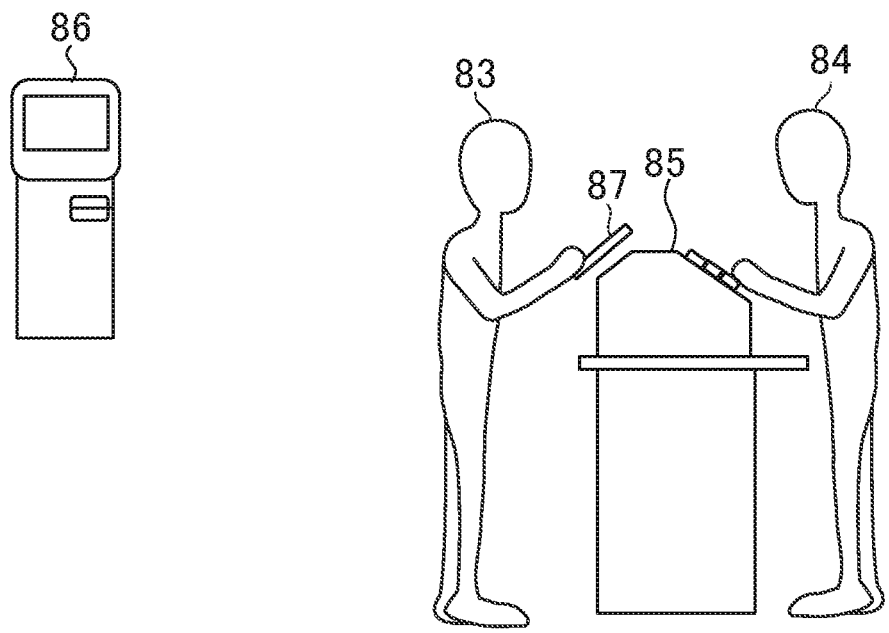
FIG. 15 is a diagram for illustrating an example of a cash register and an information terminal arranged in a store.

The present invention may be applied to the reception of package at a manned store or the like. FIG. 15 is a diagram for illustrating an example of a cash register 85 and an information terminal 86 arranged in a store. The store is, for example, a convenience store. The system of the store includes the cash register 85 and the information terminal 86 and may further include a store management server. In the example of FIG. 15, the package which is a transfer target is moved by a truck from the delivery base 3 and stored in the backyard of the store. Hereinafter, the difference from the case where the delivery box 81 is mainly used will be described.

The system of the store has a function corresponding to the authentication information reception unit 55 and a function of outputting an instruction to transfer the package to the clerk 84 when the customer 83 is authenticated as a user who can receive the package instead of the unlocking unit 58. More specifically, the authentication information reception unit 55 of the cash register 85 receives the authentication information displayed on the user terminal 87 of the customer 83 and transmits the authentication information to the central server 2. When it is authenticated that the user is appropriate, the reception control unit 56 of the central server 2 transmits a transfer instruction instead of the unlock instruction. When the customer 83 is authenticated as a user who can receive the package and the transfer instruction is received, the cash register 85 outputs the instruction to transfer the package to the clerk 84. The authentication information reception unit 55 may accept the PIN code input by the customer 83 as the authentication information or may accept the authentication information wirelessly transmitted from the user terminal 87. The authentication information reception unit 55 may be arranged in the information terminal 86.

In receiving the package in the delivery box or the store, the processing of the reception control unit 56 may be executed by the delivery box or the system of the store instead of the central server 2. In this case, the delivery box or the system of the store receives the information necessary for authentication from the central server 2 in advance, authenticates the user based on the information and the authentication information input by the user, and when it is authenticated that the user is appropriate, an unlocking instruction or a transfer instruction is output.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An information processing apparatus comprising:
   at least one processor; and
   at least one memory device that stores a plurality of instructions which, when executed by the at least one processor, causes the at least one processor to:
   acquire a user identification for a recipient user who is a recipient of a package;
      wherein the user identification is associated with a delivery location;
   determine whether to use an already issued authentication information for receiving the package based on the user identification of the recipient user and a user information for the recipient user, and the already issued authentication information is stored in association with the user identification;
      wherein the user information comprises a reuse flag which is information indicating whether or not the already issued authentication information is allowed to be reused for the delivery location and the recipient user;
      wherein the at least one processor is configured to determine whether to use an already issued authentication information for receiving the package based on a setting of the reuse flag;
      wherein the already issued authentication information is already issued to the recipient user by the information processing apparatus;
      wherein the user information is stored in a storage unit in association with the user identification of the recipient user and the already issued authentication information;
   when it is determined that the already issued authentication information is not to be used for receiving the package, issue a new authentication information to the recipient user and store the new authentication information in association with the user identification for the recipient user in the storage unit;
   when it is determined that the already issued authentication information is to be used for receiving the package, acquire the already issued authentication information stored in the storage unit to be used for receiving the package;
   receive an authentication information used for receiving the package from the recipient user;
      wherein the recipient user inputs the authentication information to a delivery vehicle which stores the package and can move in an unmanned manner;
   command that the package which is stored in the delivery vehicle be transferred to the recipient user after authenticating the recipient user based on the authentication information used for receiving the package.

2. The information processing apparatus according to claim 1, wherein the plurality of instructions cause the at least one processor to:
   notify the recipient user of the new authentication information and a first information indicating that the new authentication information has been issued when the new authentication information is issued, and
   notify the recipient user of the acquired already issued authentication information and a second information when it is determined that the already issued authentication information is used for receiving the package,
   wherein the second information is different from the first information.

3. The information processing apparatus according to claim 1, wherein the plurality of instructions cause the at least one processor to determine whether the already issued authentication information is used for receiving the package based on whether the already issued authentication information associated with the recipient user is stored in the storage unit or whether the already issued authentication information associated with a user authorized by the recipient user is stored in the storage unit.

4. The information processing apparatus according to claim 1, wherein the plurality of instructions cause the at least one processor to determine whether the already issued authentication information is used for receiving the package based on the recipient user and an attribute of the package.

5. The information processing apparatus according to claim 1,
   wherein the already issued authentication information and a time limit information of the user information are stored in the storage unit in association with a user to whom the already issued authentication information is issued,
   wherein the time limit information indicates a reuse time limit in which the already issued authentication information can be used for receiving the package, and
   wherein the plurality of instructions cause the at least one processor to determine whether the already issued authentication information is used for receiving the package based on the recipient user and the user information and the time limit information stored in the storage unit.

6. The information processing apparatus according to claim 5, wherein the reuse time limit is later than an input time limit at which the recipient user can input an authentication information to receive the package.

7. The information processing apparatus according to claim 5, wherein the reuse time limit is earlier than a time when the already issued authentication information can be newly issued to a user different from the recipient user and a user authorized by related to the recipient user in order to receive another package.

8. The information processing apparatus according to claim 5, wherein the time limit information is stored in association with the reuse flag.

9. The information processing apparatus according to claim 5, wherein the at least one processor is configured to obtain the time limit information from the user.

10. The information processing apparatus according to claim 1, wherein the plurality of instructions cause the at least one processor to determine that the already issued authentication information is used for receiving the package when the already issued authentication information is stored in the storage unit in association with the recipient user, and after the already issued authentication information is issued to the recipient user, the authentication information is not issued to a user different from the recipient user and a user authorized by the recipient user.

11. The information processing apparatus according to claim 1, wherein the plurality of instructions cause the at least one processor to command that the package be transferred to the recipient user when the recipient user inputs an authentication information used for receiving the package at a location where the package is stored.

12. The information processing apparatus according to claim 1, wherein the at least one processor is configured to obtain the setting of the reuse flag from the user.

13. The information processing apparatus according to claim 1,
wherein if the setting of the reuse flag is set to a first value to indicate that already issued authentication information is allowed to be reused, the at least one processor is configured to search for the already issued authentication information based on the recipient user and the delivery location; and
wherein if the setting of the reuse flag is set to a second value to indicate that already issued authentication information is not allowed to be reused, the at least one processor is configured to generate a candidate information of authentication information based on a random number.

14. An information processing method comprising:
acquiring, with at least one processor operating with a memory device in a system, a user identification for a recipient user who is a recipient of a package;
wherein the user identification is associated with a delivery location;
determining, with the at least one processor operating with the memory device in the system, whether to use an already issued authentication information for receiving the package based on the user identification of the recipient user and a user information for the recipient user, and the already issued authentication information is stored in association with the user identification;
wherein the user information comprises a reuse flag which is information indicating whether or not the already issued authentication information is allowed to be reused for the delivery location and the recipient user;
wherein the method comprises determining whether to use an already issued authentication information for receiving the package based on a setting of the reuse flag;
wherein the already issued authentication information is already issued to the recipient user by the information processing apparatus;
wherein the user information is stored in a storage unit in association with the user identification of the recipient user and the already issued authentication information;

when it is determined that the already issued authentication information is not to be used for receiving the package, issuing, with the at least one processor operating with the memory device in the system, a new authentication information to the recipient user and store the new authentication information in association with the user identification for the recipient user in the storage unit;
when it is determined that the already issued authentication information is to be used for receiving the package, acquiring, with the at least one processor operating with the memory device in the system, the already issued authentication information stored in the storage unit to be used for receiving the package;
receiving an authentication information used for receiving the package from the recipient user;
wherein the recipient user inputs the authentication information to a delivery vehicle which stores the package and can move in an unmanned manner;
commanding that the package which is stored in the delivery vehicle be transferred to the recipient user after authenticating the recipient user based on the authentication information used for receiving the package.

15. An information processing system comprising:
at least one processor; and
at least one memory device that stores a plurality of instructions which, when executed by the at least one processor, causes the at least one processor to:
acquire a user identification for a recipient user who is a recipient of a package;
wherein the user identification is associated with a delivery location;
determine whether to use an already issued authentication information for receiving the package based on the user identification of the recipient user and a user information for the recipient user, and the already issued authentication information is stored in association with the user identification;
wherein the user information comprises a reuse flag which is information indicating whether or not the already issued authentication information is allowed to be reused for the delivery location and the recipient user;
wherein the at least one processor determines whether to use an already issued authentication information for receiving the package based on a setting of the reuse flag;
wherein the already issued authentication information is already issued to the recipient user by the information processing apparatus;
wherein the user information is stored in a storage unit in association with the user identification of the recipient user and the already issued authentication information;
when it is determined that the already issued authentication information is not to be used for receiving the package, issue a new authentication information to the recipient user and store the new authentication information in association with the user identification for the recipient user in the storage unit;
when it is determined that the already issued authentication information is to be used for receiving the package, acquire the already issued authentication information stored in the storage unit to be used for receiving the package;
receive an authentication information used for receiving the package from the recipient user;

wherein the recipient user inputs the authentication information to a delivery vehicle which stores the package and can move in an unmanned manner;
command that the package which is stored in a delivery vehicle be transferred to the recipient user after authenticating the recipient user based on the authentication information used for receiving the package; and
transfer the package to the recipient user based on the command.

\* \* \* \* \*